Patented Aug. 27, 1946

2,406,428

UNITED STATES PATENT OFFICE 2,406,428

METAL CONTAINING PLASTIC COMPOSITION

Christopher Luckhaupt, Jamaica, N. Y., assignor to Augustus R. Southworth, Englewood, N. J.

No Drawing. Application July 16, 1943,
Serial No. 495,066

2 Claims. (Cl. 106—287)

This invention relates to plastic compositions, and is particularly directed to a new composition of matter suitable for many uses, such as the production of jigs, forming dies, bookends, lighting fixtures, etc.

More specifically my invention relates to a new powdered metal composition of matter providing a dense homogeneous mass, possessing considerable strength and highly useful for the purposes above referred to and others too numerous to mention.

Still more specifically my invention provides a composition of the character indicated from which objects may be made having low electrical conductivity, the metal particles of the composition being bound together by a binder possessing a great affinity for the metal particles so that no difficulty is experienced in the production of the composition in obtaining excellent cohesion between the particles and binder without employing either pressures or elevated temperatures.

The binder employed is litharge and glycerine. The amount of binder employed may be varied somewhat but in all cases I have found that best results are obtained when employing about 50% by weight of litharge and around 15% by weight of glycerine.

*Example A*

|  | Pounds | Per cent |
|---|---|---|
| Litharge | 4 | 57.1 |
| Iron dust | 1½ | 21.4 |
| Iron filings | ½ | 7.3 |
| Glycerine | 1 | 14.2 |

*Example B*

|  | Pounds | Per cent |
|---|---|---|
| Litharge | 4 | 59.2 |
| Iron dust | 1½ | 22.2 |
| Glycerine | 1 | 14.8 |
| Graphite | ¼ | 3.7 |

*Example C*

|  | Pounds | Ounces | Per cent |
|---|---|---|---|
| Litharge | 3 |  | 49.0 |
| Iron dust | ¾ |  | 12.2 |
| Iron filings | ¾ |  | 12.2 |
| Glycerine | 1 | 10 | 26.5 |

*Example D*

|  | Pounds | Per cent |
|---|---|---|
| Litharge | 3 | 50.0 |
| Iron dust | 1 | 16.6 |
| Iron filings | 1 | 16.6 |
| Glycerine | 1 | 16.6 |

Of the examples above set out, Example A is the best from the standpoint of density and resistance to crushing, although in all cases I produced a useful composition of matter. I find that the strength of my new composition of matter is improved if metal filings as well as powdered metal are employed as set out in Examples A, C and D. The filings are somewhat needle shaped and seem to act as a reinforcing agent with respect to the mass or aggregate.

The actual manufacture of the material is simplicity itself. I first mix the metal and the litharge until the two are well and thoroughly blended. The glycerine is then added and well mixed in. In the examples given, the material at this time is in the form of a plastic mass of about the consistency of putty or heavy dough, sufficiently workable at that stage to enable the same to be placed in a mould and for it to take the shape of the mould without the employment of pressure. The material is then allowed to stand at room temperature until it has thoroughly set. This depends upon the quantity of material undergoing processing. A small quantity requires but a short time, may be an hour to set up, while twice the amount would require a longer period. In the quantities given in the above examples, two hours is a sufficient setting period.

Apparently some chemical reaction takes place because I find that after the ingredients are mixed the temperature of the mass rises somewhat above room temperature. I find also that aging has a beneficial effect in that the hardness of the mass increases somewhat as time goes on. I believe this change is due to the activation of the metal by the litharge and glycerine to produce a tighter bond or knit.

It is impossible to mention all of the uses to which this composition of matter may be put. And whether the mass is molded or not, in that it is placed in a closed mould and allowed to set, or whether it is simply placed in an open container and allowed to set, depends upon circumstances, mainly upon the use to be made of the material, because it is to be appreciated that my composition of matter need not be molded into final form in that it can be worked with ordinary metal working tools the same as cast iron, tool steels and other metals. In all cases I obtain a homogeneous aggregate in which the particles of metal are each surrounded by and held to each other by the litharge and glycerine.

Inasmuch as the litharge and glycerine are high resistance materials, objects produced by my process while high in metal content are poor electrical conductors which may be of advantage in cases where hardness and high resistance to crushing is desired but high electrical conductivity would be detrimental.

It is to be understood that the proportions of the ingredients of the materials employed may be varied from those above given, although as I have already stated apparently best results are obtained employing around 50% by weight of litharge and 15% by weight of glycerine.

What I claim is:

1. A plastic composition comprising a homogeneous aggregate of between about 49% and about 59% by weight litharge, between about 23% and about 33% by weight of finely divided metallic particles, and between about 15% and about 26% by weight glycerin.

2. A plastic composition comprising a homogeneous aggregate of between about 49% and about 59% by weight litharge, between about 23% and about 33% by weight of finely divided metallic iron particles, and between about 15% and about 26% by weight glycerin.

CHRISTOPHER LUCKHAUPT.